United States Patent Office 2,939,883
Patented June 7, 1960

2,939,883

DEHYDROGENATION OF ALCOHOLS TO ALDEHYDES

John Oliver Punderson, Wilmington, Del., assignor to E. I. du Pont de Nemours and Company, Wilmington, Del., a corporation of Delaware No Drawing. Filed Feb. 25, 1957, Ser. No. 641,837

10 Claims. (Cl. 260—603)

This invention relates to a process for the catalytic conversion of alcohols to aldehydes by dehydrogenation and more especially to the catalytic dehydrogenation of methanol to formaldehyde using a silver-copper alloy catalyst.

Catalytic dehydrogenation of alcohols to aldehydes has been known for many years, and commercial processes have been developed in some cases for the dehydrogenation of alcohols containing two or more carbon atoms. It has also been known for many years that methanol can be dehydrogenated to give formaldehyde, but in this case no commercial process has been forthcoming, and, indeed, there is no indication from prior art reports that methanol has ever in the past been catalytically dehydrogenated to formaldehyde in high conversions and yields as required for a practical process.

It was recognized by early workers in this field that elevated temperatures favored the conversion of methanol to formaldehyde over catalysts such as copper, but it was also found that high yields were not easily attained because of the tendency of formaldehyde to further decompose at these temperatures. Sabatier and Reid in "Catalysis in Organic Chemistry," D. Van Nostrand, 1923, page 235, reported that "The destruction of formaldehyde is already apparent at 240–260° (C.), hydrogen and carbon monoxide being produced along with a little methyl formate, this destruction increasing rapidly with rise of temperature, till at 400° (C.) at least 75% is decomposed."

The primary reactions occurring in the methanol dehydrogenation system are:

(1) 
$$CH_3OH \rightleftharpoons CH_2O + H_2$$

(2) 
$$CH_2O \rightarrow CO + H_2$$

For a practical dehydrogenation process it is necessary to operate under conditions of temperature and pressure such that the equilibrium of Reaction 1 allows most of the methanol to be converted to formaldehyde and hydrogen. It is also necessary to provide a catalyst which is very selective in promoting a maximum rate of dehydrogenation of methanol to formaldehyde in Reaction 1 while at the same time not promoting excessive dehydrogenation of formaldehyde to carbon monoxide in Reaction 2. A recent study using modern thermodynamic data and calculations has confirmed earlier observations that very high temperatures are required to attain a reasonably favorable equilibrium conversion to formaldehyde in Reaction 1. For example, it was shown that a temperature of 800° K. (527° C.) is required for 91% equilibrium conversion to formaldehyde operating at one atmosphere pressure (E. Jones and G. G. Fowlie, Journal of Applied Chemistry, volume 3, pages 208–209, 1953).

Considering this, together with the known fact that formaldehyde vapor starts to decompose at 300° C., one would expect from a knowledge of these prior art teachings that at the high temperatures required for dehydrogenation of methanol, the formaldehyde produced would be destroyed almost as quickly as it is formed. Jones and Fowlie summarized their study of this system as follows:

"It thus appears that, as a potential process for the manufacture of formaldehyde, straight dehydrogenation is not attractive, and the failure of all attempts to evolve a practical method on these lines confirms this conclusion."

The process of the present invention is not to be confused with the air oxidation of methanol to formaldehyde in which air or fortified oxygen is reacted with methanol, nor with the composite processes in which a substantial amount of air oxidation is occurring simultaneously with some dehydrogenation. The air oxidation process has been considered by theorists to involve possibly two steps, one of oxidation and one of dehydrogenation, the steps occurring successively. Quite to the contrary, the process of the present invention involves but the single reaction, dehydrogenation.

An object of the invention is to provide an improved process for the catalytic dehydrogenation of alcohols to aldehydes and more particularly to provide a process for dehydrogenating methanol to formaldehyde. A further object is to provide a highly selective dehydrogenation catalyst for the aforesaid processes. Yet another object is to provide a method of regenerating the dehydrogenation catalysts of the invention. Still another object is to provide such processes which are conducted by cyclic operation. Other objects and advantages of the invention will hereinafter appear.

The dehydrogenation of methanol to formaldehyde is conducted in accord with the process of the invention by preheating the methanol in one or more stages to reaction temperature and passing the hot alcohol in the vapor phase over a certain dehydrogenation catalyst. Other alcohols can be similarly dehydrogenated, such, for example, as the aliphatic or aromatic alcohols, e.g., ethanol, propanol, butanol, benzyl alcohol, tolyl alcohol, ethylene glycol, and like higher molecular weight alcohols. The products of the dehydrogenation are cooled and may be condensed directly or passed through any suitable type of a scrubbing device in which the formaldehyde is separated from the hydrogen by absorption in water or other suitable absorbing liquid, or the product gases may be otherwise treated by well known methods for the separation of the formaldehyde and recovery of the hydrogen and unreacted methanol for reuse.

Successful commercial operation of a process for the dehydrogenation of methanol is realized only (1) when an active catalyst for the dehydrogenation reaction is used; (2) when the catalyst is selective in promoting the reaction leading to formaldehyde with minimum formation of carbon monoxide, methyl formate, or other undesired products; (3) when the catalyst retains its activity and selectivity over a reasonable period of time; and (4) when the spent catalyst can be regenerated and used repeatedly. Copper, as Sabatier et al. reported, can be used as a dehydrogenation catalyst for both methanol and higher alcohols. Although Sabatier et al. describe copper as being able to continue the dehydrogenation reaction indefinitely, it has been the common experience of other workers that copper catalysts lack stability and lose activity quite rapidly. Some success has been reported in regenerating copper catalysts for dehydrogenation of ethanol and higher alcohols (see, for example, J. M. Church and H. K. Joshi, Industrial and Engineering Chemistry, 43, 1804–1811 (1951)), but in the present study many attempts to regenerate copper for the dehydrogenation of methanol within the temperature range of the present invention have resulted in only transient activity and very poor selectivity.

Extensive research, conducted in developing the invention, has shown that copper-silver alloys containing low amounts of silver, from 0.2 to 10%, are fair catalysts for the dehydrogenation of methanol, but are relatively short-lived, like pure copper. These catalysts are, however, slightly more selective for the formaldehyde Reaction 1 after regeneration than copper alone. As noted above, most copper catalysts per se are generally difficult if not impossible to regenerate to a selective condition after the initial short period of operation.

Subsequent to the study of low silver-high copper catalysts, a copper-silver eutectic mixture (71.9% Ag, 28.1% Cu, M.P. 778° C.) was made and found to have an activity similar to that of copper alone during the first cycle of operation, but quite different after attempted regeneration; while copper alone was generally unregeneratable to a selective condition to promote Reaction 1, after initial use, the eutectic catalyst was readily regenerated to that condition. The regeneration procedure for the eutectic and other catalysts involved interruption of the flow of the methanol introduced into the reaction zone and replacing it by a stream of a regenerating gas containing air or oxygen. The regenerating gas was passed over the catalyst under the same conditions of temperature and pressure used for the dehydrogenation for from 2 minutes to 1 hour, although 7 minutes was used in most cases. The methanol to formaldehyde reaction was then resumed by replacing the regenerating gas by methanol.

While the silver-copper eutectic alloy was superior to copper, it could not be regenerated indefinitely to give a selective catalyst. Both selectivity and catalyst life became poorer on successive regenerations and the catalyst behavior followed closely that of pure copper after a number of attempted regenerations. Substantially pure silver was then used and was found to be very poor in activity and life and the activity improved only slightly after repeated regenerations. This poor showing for pure silver in the dehydrogenation reaction should be contrasted with the excellent activity and selectivity of this catalyst for the air oxidation process. Pure silver is very extensively used in the commercial oxidation processes; however, for the dehydrogenation reaction alone, it is of little value due principally to lack of activity under conditions in which little or no oxygen is present in the vapor fed to the catalyst bed.

A silver-copper catalyst was then prepared in which the copper content was about 1% and the resulting high silver-low copper catalyst, while not outstandingly active at first, became increasingly active after repeated regenerations. After three cycles of use and regeneration, the conversion of methanol increased to 50% with 80% yield of formaldehyde in a dehydrogenation reaction conducted over 7.5 ml. of 8–20 mesh catalyst in shot form at 650° C., with a feed rate of 5.1 millimol per minute of methanol. The regeneration was conducted at the same temperature by a 3 to 10 minutes air treatment. This catalyst was continued in cyclic operations (i.e., a series of operations on-stream for dehydrogenation and off-stream for regeneration), for an extended period during which the catalyst was on-stream for more than 20 hours and was regenerated 9 times. Conversions and yields obtained at various times are listed in Table I which contains data from a process conducted under the above conditions. The remarkable combination of activity and selectivity possessed by this catalyst after regeneration was completely unexpected in view of prior art studies and could not be anticipated from the known catalytic behavior of either silver or copper alone.

TABLE I

*99% silver–1% copper catalyst*

| Time, Min. | Cycle | Conv. of $CH_3OH$ percent | Conv. to $CH_2O$ percent | Yield of $CH_2O$ percent |
|---|---|---|---|---|
| 154 | Middle of 4th | 50.4 | 40.3 | 80.1 |
| 290 | Middle of 5th | 72.5 | 51.1 | 70.5 |
| 437 | Beginning of 6th | 96.3 | 51.7 | 53.7 |
| 612 | Beginning of 7th | 99.3 | 45.1 | 45.5 |
| 708 | Middle of 7th | 58.4 | 37.8 | 64.8 |
| 1,114 | Beginning of 9th | 90.4 | 35.2 | 39.0 |
| 1,191 | End of 9th | 56.5 | 41.6 | 72.1 |
| 1,235 | Beginning of 10th | 100.0 | 41.1 | 41.1 |
| 1,316 | Middle of 10th | 60.4 | 38.7 | 64.0 |
| 1,393 | End of 10th | 57.7 | 32.7 | 60.9 |

The catalyst described in Table I had a satisfactory and economical life cycle. That catalyst, however, did have a tendency to sinter and fuse during operation. It was then discovered that this tendency of silver-copper alloy catalyst to fuse and sinter under dehydrogenation temperatures between 600° C. and 700° C. could be markedly reduced by the incorporation of a small amount of an anti-sintering agent such as molybdenum, manganese, chromium or vanadium, and especially metallic silicon. A ternary alloy containing 98.8% silver, 1% copper and 0.2% silicon was prepared which resisted sintering at 650° C. and became highly active and selective after the seventh cycle of use. During the ninth cycle of use it gave 70% conversion of methanol and 82% yield of formaldehyde. Even better results were obtained with a catalyst containing 97.8% silver, 2% copper and 0.2% silicon. Activity and selectivity were good after the third cycle, and at least one hour of useful activity was obtained during each cycle. Sintering was relatively slight. Chemical analyses of the products obtained during the seventh cycle, when operating the dehydrogenation at 650° C. with the latter catalyst, are given in Table II.

TABLE II

| Results | Beginning of Seventh Cycle | End of Seventh Cycle |
|---|---|---|
| Conversion of $CH_3OH$, percent | 91.1 | 71.5 |
| Conversion to $CH_2O$, percent | 58.8 | 53.0 |
| Yield of $CH_2O$, percent | 64.5 | 74.2 |
| $CH_2O$ in condensable product, percent | 86.8 | 65.1 |

The catalyst is prepared by any suitable process in which the metals are alloyed and thereafter formed in the desired shape for use as a catalyst. For example, the desired weights of copper and silver are, mixed with or without an anti-sintering agent, charged into an electrically heated, graphite-lined, induction furnace provided with a bottom discharge orifice or orifices, heated and alloyed therein. The molten alloy is then discharged as a stream or streams which may be broken up during solidification into discrete particles by means of a shot tower or other suitable device. A quenching fluid, impinging on the falling and solidifying alloy, may be used to control the size of the formed alloy particles. The comminuted alloy is collected, dried, if water has been used as the quenching fluid, and after screening to 8–20 U.S. standard mesh size is ready for use as a catalyst. While the pelleted catalyst is the preferred form, other suitable forms may be used such, for example, as a supported catalyst, skeletonized catalyst (prepared by including in the melt a metal such as aluminum that is removed by a caustic solution after shotting), or any other suitable catalyst form.

Various compositions in the Ag—Cu—Si system showed that the copper and silicon concentrations were strongly interacting in their effects on the catalysis. Copper was a definite promoter for the dehydrogenation but too much copper tended to make the catalyst unselective and short-lived after regeneration. Silicon was highly beneficial in reducing catalyst sintering. With increase in silicon content, however, it was found that the catalytic activity decreased. With 1% of silicon, no useful activity could be obtained using 2 to 7% of copper; while with 0.5% of silicon the catalyst was inactive using 2% copper and gave only short cycles of activity with 4 to 7% copper.

From the above and other considerations it has been determined that preferred catalysts for the dehydrogenation of methanol to formaldehyde are high silver-low copper catalysts containing 0.2 to 10% by weight of copper and more particularly such alloys with copper ranging from 0.3 to 5% by weight. These catalysts are used at temperatures between 550° C. and 750° C., preferably between 625° C. and 675° C., and space velocities between 100 to 5000 and preferably 500 to 2000 (i.e. the cubic feet per minute of methanol vapor calculated at S.T.P. flowing per cubic foot of catalyst bed). Such catalysts can be used alone or alloyed with an anti-sintering agent present to the extent of from 0 to 0.4% by weight. The dehydrogenation with such catalysts may, if desired, be conducted under reduced, normal or superatmospheric pressures. The vapor fed to the catalyst bed may be pure methanol or a mixture of methanol with an inert gas such as nitrogen.

In the Table which follows methanol vapor, at a temperature of 650° C. and at 5.1 millimols per minute, and an equimolar amount of nitrogen were passed through a 7.5 ml. bed of 8–20 mesh shot catalyst, the catalyst also being heated to a temperature of 650° C. Regeneration of the catalyst after each cycle of use was carried out by treatment with air for 7 minutes at operating tempertures as described above. Regeneration was started when the activity of the catalyst fell below about 70% methanol conversion, as determined by analysis of the product stream for unreacted methanol.

activating the catalyst by heating in an oxygen-containing gas.

2. A process for the catalytic dehydrogenation of methanol to formaldehyde which comprises dehydrogenating methanol at a temperature between 550° C. and 750° C. in the presence of a silver catalyst promoted with from about 0.2% to about 10% by weight of copper, and after the activity of the dehydrogenation has decreased to an unsatisfactory level, reactivating the catalyst by heating in an oxygen-containing gas.

3. The process of claim 2 in which the silver-copper catalyst contains from 0.2% to 10% by weight of copper, the remainder being substantially all silver.

4. The process of claim 3 in which the catalyst contains up to 0.4% of an anti-sintering agent of the group of elements consisting of molybdenum, manganese, chromium, vanadium and silicon.

5. In a cyclic process for the catalytic dehydrogenation of methanol to formaldehyde, the steps which comprise conducting the dehydrogenation of methanol to formaldehyde, at a temperature between 550° C. and 750° C., in the presence of a silicon-containing, copper-promoted silver catalyst, containing principally silver with 0.2% to 10% of copper and up to about 0.4% of silicon, the percentages being by weight, after the activity of the dehydrogenation reaction has decreased, reactivating the catalyst by passing an oxygen-containing gas at reaction temperatures over the catalyst, and thereafter repeating the dehydrogenation reaction.

6. A process for the catalytic dehydrogenation of methanol to formaldehyde which comprises dehydrogenating methanol at a tempearture between 550° C. and 750° C. in the presence of a silver catalyst promoted with from about 0.2% to about 10% by weight of copper, and after the activity of the catalyst falls below about 70% methanol conversion, reactivating the catalyst by heating in an oxygen-containing gas.

TABLE III

| Example No. | Catalyst Compositions | | | Cycle No. | Approx. Cycle Length, Min. | Conversion of CH₃OH, percent | Yield of CH₂O percent |
| --- | --- | --- | --- | --- | --- | --- | --- |
| | Ag, percent | Cu, percent | Si, percent | | | | |
| 1a | 71.9 | 28.1 | | 1st | 100 | 81 | 62. |
| 1b | 71.9 | 28.1 | | 3rd | 20 | 80 | 81. |
| 1c | 71.9 | 28.1 | | 4th | 10 | | |
| 2a | 99.0 | 1.0 | | 1st to 3rd | | relatively inactive | relatively inactive. |
| 2b | 99.0 | 1.0 | | 4th to 10th | 150 | 50 to 100 | 40 to 80. |
| 3a | 99.5 | 0.5 | | 1st to 7th | | relatively inactive | relatively inactive. |
| 3b | 99.5 | 0.5 | | 8th to 15th | 55 | 64 to 100 | 52 to 79. |
| 4 | 98.8 | 1.0 | 0.2 | 9th | 10–20 | 70 | 82. |
| 5 | 97.8 | 2.0 | 0.2 | 7th | 60 | 71.5 to 91.1 | 64.5 to 74.2. |
| 6 | 97.9 | 2.0 | 0.1 | 4th to 13th | 60 | 70 to 95 | 62 to 74. |
| 7 | 97.8 | 2.0 | 0.2 | 6th to 11th | 60 | 70 to 95 | 50 to 82. |
| 8 | 97.95 | 2.0 | 0.05 | 7th | 90 | 73 to 97 | 32.9 to 60.0. |
| 9 | 97.8 | 2.0 | 0.2 | 9th | 60 | 79 to 99.6 | 66.5 to 77.4. |
| 10 | 92.5 | 7.0 | 0.5 | 9th | | 70.8 | 68.5. |

If supported catalysts are used, a support should be used that is inert to the dehydrogenation reaction. Granular quartz and acid-washed, granular silicon carbide are satisfactory supports, particularly because they are relatively inert toward methanol and formaldehyde at dehydrogenation temperatures. Very porous supports should preferably be avoided, for such supports and especially those having a high degree of porosity tend to decrease the selectivity of the catalyst.

I claim:

1. A process for the catalytic dehydrogenation of an alcohol to its corresponding aldehyde which comprises dehydrogenating an aliphatic alcohol at a temperature between 550° C. and 750° C. in the presence of a silver catalyst promoted with from about 0.2% to about 10% by weight of copper, and after the activity of the dehydrogenation has decreased to an unsatisfactory level, re- 7. The process of claim 6 in which the catalyst contains up to 0.4% of silicon.

8. The process of claim 6 in which the catalyst has approximately this analysis—97.8% silver; 2% copper; and 0.2% silicon.

9. In a process for the conversion of methanol to formaldehyde, the steps which comprise passing methanol, at a temperature between 550° C. and 750° C., over a silver catalyst promoted with from 0.2% to 10% by weight of copper, and after the activity of the catalyst falls below about 70% methanol conversion, reactivating the catalyst by heating in a stream of an oxygen-containing gas.

10. The process of claim 9 in which the catalyst contains up to 0.4% of silicon.

(References on following page)

References Cited in the file of this patent

UNITED STATES PATENTS

| | | |
|---|---|---|
| 1,100,076 | Hochstetter | June 16, 1914 |
| 1,608,075 | Wallin | Nov. 23, 1926 |
| 1,908,190 | Schollkopf | May 9, 1933 |
| 2,189,383 | Ralston et al. | Feb. 6, 1940 |
| 2,307,421 | Overhoff | Jan. 5, 1943 |
| 2,424,083 | Finch et al. | July 15, 1947 |
| 2,465,498 | Uhl et al. | Mar. 29, 1949 |

FOREIGN PATENTS

| | | |
|---|---|---|
| 163,980 | Great Britain | July 17, 1922 |

OTHER REFERENCES

Fiat Final Report 999, "Formaldehyde Manufacture in the I. G. Farbenindustrie," pp. 1–6, April 2, 1947.

Wallace et al.: Ind. and Eng. Chem., vol. 44, No. 7 (1952), pp. 1508–1518, p. 1510 relied on.